Jan. 24, 1967   O. LINDSTROM   3,299,861
ARRANGEMENT FOR INCREASING THE SURFACE OF
A BOILING SOLUTION SURFACE
Filed Feb. 26, 1963
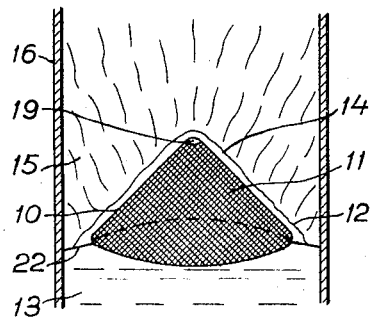
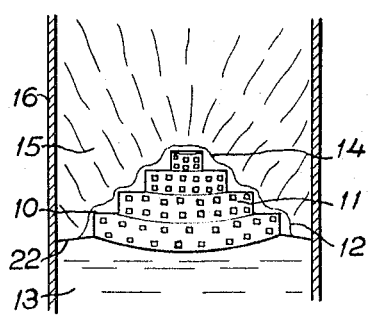
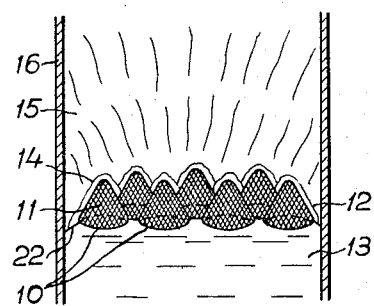
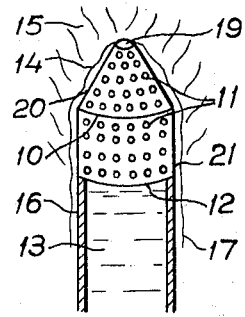
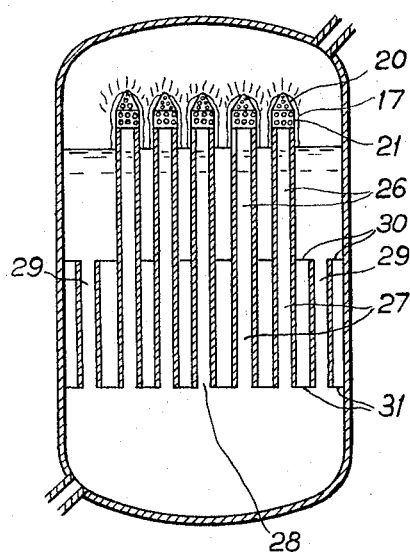
INVENTOR.
OLLE LINDSTROM
BY
Bailey, Stephens & Huettig
Attorneys

United States Patent Office 3,299,861
Patented Jan. 24, 1967

3,299,861
ARRANGEMENT FOR INCREASING THE SURFACE OF A BOILING SOLUTION SURFACE
Olle Lindstrom, Vasteras, Sweden, assignor to Allmanna Svenska Elektriska Aktiebolaget, Vasteras, Sweden, a corporation of Sweden
Filed Feb. 26, 1963, Ser. No. 261,091
4 Claims. (Cl. 122—501)

The steam production from a boiling liquid surface, e.g. in a homogeneous or heterogeneous nuclear boiling reactor, is determined, among other things by the size of the liquid surface where the steam separation takes place.

The present invention relates to a surprisingly simple arrangement for increasing the surface of a boiling liquid surface. The invention is characterized in that it includes one or more screens arranged in the liquid surface, provided with holes or openings and having a cross-section circumference or a summed-up cross-section circumference (together) respectively substantially decreasing in the direction from below and upwards, which is (or are) so arranged that it is (or they are) substantially covered in their entirety by the boiling liquid surface and which is (or are) filled on the inside with a mixture of the boiling liquid and steam formed from this. The holes or openings of each screen have such size, shape and distribution over the surface that the boiling liquid is caused to fill up the larger part of the interior volume of the screen, a flow of liquid steam mixture then taking place through the openings of the screen to the outside of the screen. The size, shape and distribution of the holes is dependent on the physical properties of the liquid, the operating pressure and on the degree and type of circulation occurring in the solution.

The arrangement according to the invention enables a considerable increase of the liquid surface through its capacity to strengthen and stabilize the tendency of peak-forming, which is observed with vigorously boiling liquids. This has the effect that the possible steam production of a boiling liquid, for example, in a nuclear boiling reactor, may be increased considerably.

In order that the boiling liquid may fill up the screen on the inside as completely as possible, the resistance per surface unit of the screen against the flow of fluid steam mixture which occurs through it should be greater in the lower than in the upper part of the screen. This may be effected for example, by using holes of the same size over the whole shield and arranging them successively tighter in the direction from below and upwards or by using the same number of holes per surface unit over the whole screen and successively increasing their size in the direction from below and upwards.

In order that the increase in boiling liquid surface shall be large, the surface of the screen (or surface of the screens) respectively should be relatively large and suitably larger than the surface of the projection in horizontal plane of the boiling liquid surface, and further the screen (or screens) at the bottom should take up the larger part of the above-mentioned projection.

The screens are normally manufactured of a material which is resistant to the boiling liquid. They could advantageously be made of metallic material, but also for example of plastics, such as, among other things, polytetrafluorethylene, could be considered for liquids with moderate boiling temperatures. The screens may for example be formed of a suitable metal plate, in which holes or openings of desired form are punched.

Good results are also attained with the use, among other things, of screens manufactured of wire netting, for example, of metal wire netting, where the meshes of the net form holes or openings. So-called expanded metal (stretched metal) may also be used with advantage.

The invention will be more clearly described by means of a number of examples with reference to the accompanying drawing, in which schematically in FIGURE 1 is shown an arrangement consisting of a conical screen with net walls arranged in a liquid surface, in FIGURE 2 an arrangement consisting of a step-shaped screen manufactured of metal plate with punched square holes, in FIGURE 3 an arrangement consisting of several conical screens alongside each other, manufactured of expanded metal (stretched metal), in FIGURE 4 an arrangement consisting of a partly cylindrical and partly conical screen of metal plate with punched round holes arranged on the top of a boiler element tube for a heterogeneous reactor, and 5 a heterogeneous reactor provided with boiler element according to FIGURE 4. The screens schematically illustrated in the figures constitute only a few of the very great number of screens with upwards descreasing cross-section circumference, which may be used. Among similar ones with regular shape may in addition be mentioned, among other things, those with substantially spheroidal, paraboloidal and hyperboloidal shape. The shape of the hole may of course be varied to a great extent and holes with regular as well as irregular shape may be used. The holes in the figures have been drawn exaggeratedly large for the purpose of illustration. The screen which according to FIGURE 1 has conical shape and is manufactured of wire netting, is designated 10 and its holes or openings with 11. The screen is arranged in the boiling liquid surface 12. The boiling liquid 13 fills up the cone on the inside, the cone having no bottom and being open below. On the outside of the cone a continuous liquid surface 14 is formed, which constitutes a part of the liquid surface 12. From the boiling liquid surface steam 15 escapes. The walls of the vessel, e.g. a reactor vessel for a homogeneous nuclear boiling reactor, in which the boiling fuel composition is kept are designated 16. The screen 10 is held in position in any suitable way, for example by mechanical supports 22 connected to the walls 16.

In the FIGURES 2–4 the designations for each of the arrangements corresponding to those in FIGURE 1 have been retained. In the screen according to FIGURE 2 the holes are the same size overall but the number of holes per surface unit are larger in the upper part of the screen than in its lower part. In accordance with FIGURE 3 the arrangement increasing the surface of a boiling liquid surface consists of several screens. In accordance with FIGURE 4 the screen 10 having an upper conical part 20 and a lower cylindrical part 21 is arranged on the top of the vessel in which the liquid is kept. In the arrangement illustrated in FIGURE 4 the upper part consisting of the means 20 and 21 is shown in side perspective view and the lower part consisting of the means 13 and 16 in sectional view. This method of arranging the screen is especially suitable for heterogeneous boiling reactors, in which 16 indicates the walls of the risers occurring on top of the fuel element tube. As is more clear from FIGURE 5, the liquid 17, being a coolant in the form of heavy or light water, escapes from the screen and is returned in general to the inlet ends of the fuel element tubes via downcomers. In FIGURE 5 the reactor is designated 25, the risers 26, the fuel element tubes 27, the inlet ends of the fuel element 28, the downcomers 29 and supports for the fuel elements and the downcomers 30 and 31 respectively. An arrangement according to the invention consisting of a screen with conical shape as is the case in FIGURE 1, but of plate with round holes, may be manufactured of zirconium alloy, e.g. Zircaloy-2. A screen of such material is especially suitable for use in homogeneous boiling nuclear reactors. The plate thickness may be 2 mm., and the diameter of the holes 10 mm. The holes may be distributed so that the free area is 10% in the lower end of the screen and successively increases upwards to be 25% in the upper part. By free area is meant thereby the ratio between the area of the holes and the total area of the screen, expressed in percent. The screen may have a base diameter of 3.5 m. and be intended for a cylindrical pressure vessel with an inner diameter of 3.7 m. The opening 19 in the top of the cone has a diameter of 2 dm. The height of the cone may be 1.3 m. The boiling liquid of the homogeneous reactor may consist of heavy water containing dispersed reactor fuel such as oxides of thorium and uranium. The operating pressure of the reactor may be 35 atm. Natural self-circulation may prevail in the liquid.

When the screen, e.g. in accordance with FIGURE 4, is used in the top of a riser on the top of a fuel element tube for a heterogeneous boiling reactor, it may also be manufactured of, for example, plate of Zircaloy-2. The plate thickness may thereby be ca. 3 mm. and the diameter of the holes 5–15 mm. The holes may be distributed so that the free area is 10% in the lower end of the shield and successively increases upwards to be 25% in the upper part. The base diameter of the screen may advantageously be made the same size as the diameter of the fuel element tube, for example 200 mm. The diameter of the opening 19 may be ca. 100 mm. and the height of the cone 400 mm., and of the cylindrical part supplied with holes 100 mm. The liquid may consist of heavy water or light water as mentioned above.

I claim:

1. A boiler element tube for a heterogeneous boiling nuclear reactor, means providing a boiling coolant in said element tube, said boiler element tube having a top, said boiling coolant passing through the top of the tube, said top being provided with a screen extending over substantially the whole open cross-section of the top, said screen having a wall and hole distributed over said wall, said holes rendering said wall pervious to the boiling coolant, said screen having a base and a top and a hollow interior communicating with the interior of the tube, the cross-sectional circumference of the top of the screen being smaller than the cross-sectional circumference of the base of the screen, the boiling coolant substantially filling the interior of the screen.

2. A boiler element tube as claimed in claim 1, in which the resistance to liquid flow through the wall of the screen is greater in the base portion of the screen than in the top portion of the screen.

3. A boiler element tube as claimed in claim 1, in which the holes in the wall of the screen are arranged successively more closely in the direction from the base of the screen to the top of the screen.

4. A boiler element tube as claimed in claim 1, in which the size of the holes in the wall are successively greater in the direction from the base of the screen to the top of the screen.

References Cited by the Examiner

UNITED STATES PATENTS

| 502,418 | 8/1893 | Kreusler | 122—502 |
|---|---|---|---|
| 502,729 | 8/1893 | Kreusler | 122—366 |
| 655,274 | 8/1900 | Ramsden | 122—501 |
| 1,418,234 | 5/1922 | Cleary | 122—501 |
| 2,277,100 | 3/1942 | Hartmann | 122—489 X |
| 2,325,818 | 8/1943 | Weitkamp et al. | 261—95 |
| 2,594,585 | 4/1952 | Ridgway | 261—95 |
| 2,825,688 | 3/1958 | Vernon | 204—193.2 |
| 3,034,975 | 5/1962 | Beurtheret | 204—193.2 |
| 3,036,965 | 5/1962 | Braun | 204—193.2 |
| 3,041,264 | 6/1962 | Ricard | 204—193.2 |

FOREIGN PATENTS 388,859  1/1924  Germany.

KENNETH W. SPRAGUE, *Primary Examiner.*

REUBEN EPSTEIN, ROBERT A. O'LEARY, PERCY L. PATRICK, JAMES W. WESTHAVER,
*Examiners.*

J. D. RUTLEDGE, M. L. BATES, *Assistant Examiners.*